United States Patent [19]

Hansen

[11] 4,161,331
[45] Jul. 17, 1979

[54] SPHERICAL IRRIGATION PIPE COUPLING WITH REPLACEABLE SEAL

[75] Inventor: James E. Hansen, Spokane, Wash.

[73] Assignee: Gifford-Hill & Company, Inc., Spokane, Wash.

[21] Appl. No.: 799,140

[22] Filed: May 23, 1977

[51] Int. Cl.² ............... B05B 15/00; F16L 27/02; F16L 27/06; F16L 55/00
[52] U.S. Cl. .......................... 285/5; 285/16; 285/18; 285/261; 285/373
[58] Field of Search ............. 285/5, 325, 373, 261, 285/23, 24, 18, 16, 262, 61, 64, 264

[56] References Cited

U.S. PATENT DOCUMENTS

| 143,348 | 9/1873 | Holmes | 285/325 |
|---|---|---|---|
| 566,410 | 8/1896 | Schinke | 285/261 |
| 656,956 | 8/1900 | Eibee | 285/325 X |
| 1,162,527 | 11/1915 | Tabbert | 285/261 |
| 1,514,327 | 11/1924 | Krause | 285/5 |
| 1,782,062 | 11/1930 | Erickson | 285/261 |
| 3,153,550 | 10/1964 | Hollett | 285/373 X |
| 3,393,928 | 7/1968 | Dutcher | 285/325 X |
| 3,608,826 | 9/1971 | Reinke | 285/236 |
| 3,997,192 | 12/1976 | Hansen | 285/5 |
| 4,018,979 | 4/1977 | Young | 285/373 X |

FOREIGN PATENT DOCUMENTS

| 570998 | 9/1958 | Belgium | 285/5 |
|---|---|---|---|
| 74053 | 1/1917 | Switzerland | 285/261 |
| 4434 of | 1884 | United Kingdom | 285/261 |

Primary Examiner—Mervin Stein
Assistant Examiner—Carl F. Pietruszka
Attorney, Agent, or Firm—James L. Jackson

[57] ABSTRACT

In accordance with the present invention, irrigation pipe couplings for movable irrigation systems may include a spherical coupling structure that allows articulation of sections of the irrigation pipe during operation of the irrigation system. A sealing element is provided that maintains a positive seal when the various sections of irrigation pipe of the irrigation system are static or are moving. The internal and external components of the coupling structure and the sealing element of each of the couplings cooperate in such manner that the sealing elements are easily and quickly replaceable should they become worn or damaged. It is not necessary to cause longitudinal separation of the sections of irrigation pipe to which the coupling structures are affixed in order to achieve replacement of the sealing element. A portion of the external part of the coupling structure provides support for one extremity of one of the pipe sections that are coupled, both in normal operation and during replacement of the sealing element.

14 Claims, 4 Drawing Figures

FIG.1
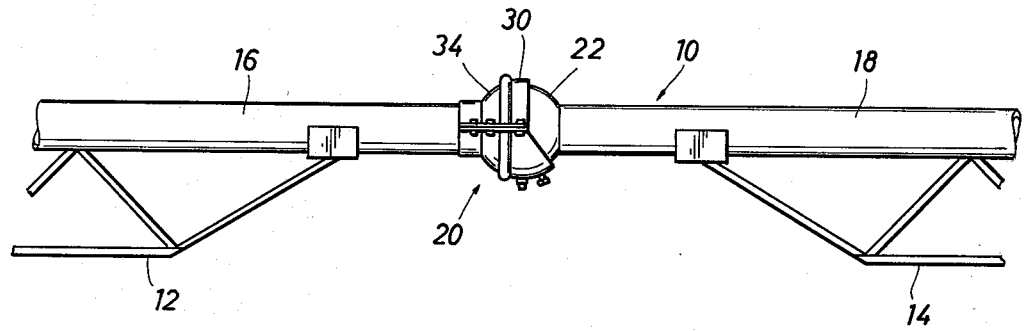
FIG.2
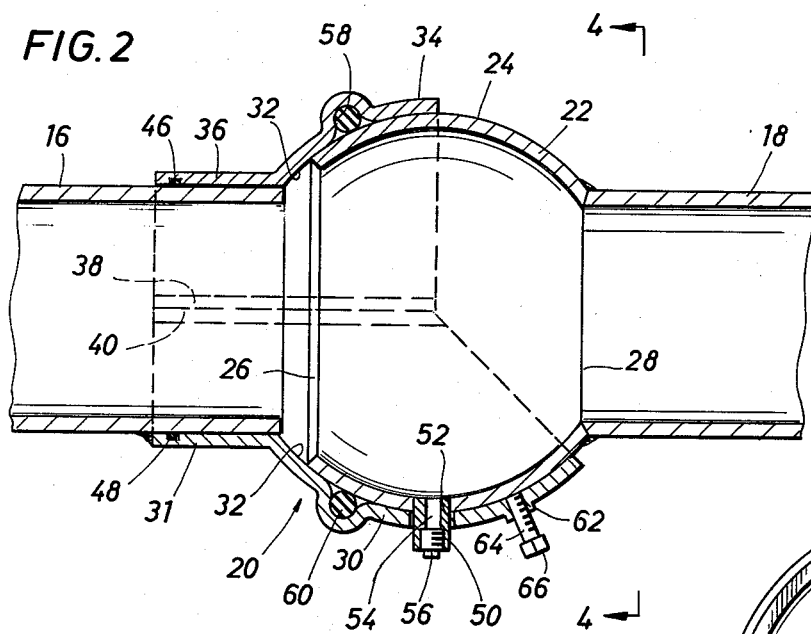
FIG.3
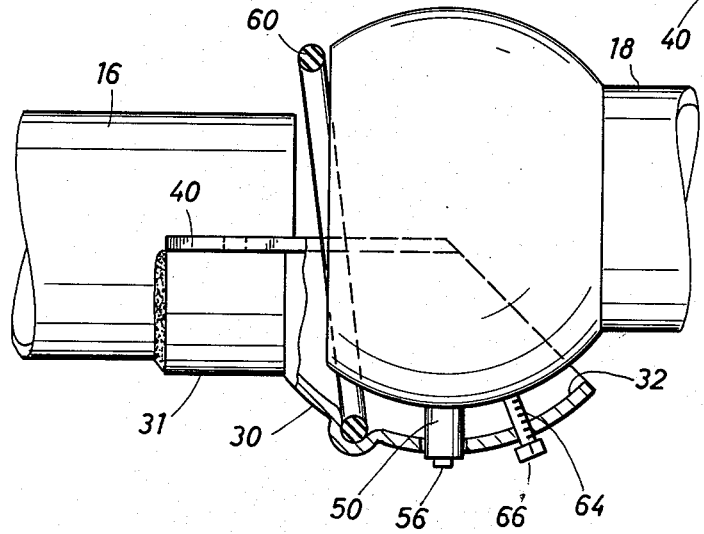
FIG.4

SPHERICAL IRRIGATION PIPE COUPLING WITH REPLACEABLE SEAL

FIELD OF THE INVENTION

This invention relates generally to continuously movable irrigation systems for irrigating large land areas such as fields of crops that may be irrigated by wheel-supported movable irrigation systems that are moved over the land surface while spraying water therefrom. More specifically, the present invention is directed to a universally movable coupling structure for irrigation pipe sections including a sealing element that maintains a positive seal at all times, even though the coupling structure may be subjected to a certain degree of movement during articulation of the various sections of irrigation pipe that make up the water-carrying conduit of the irrigation system. Even more specifically, the present invention is directed to a cooperative seal and coupling structure that facilitates simple and efficient replacement of the sealing element in the event the sealing element becomes worn or damaged to the point that it does not seal properly.

BACKGROUND OF THE INVENTION

Automatically movable irrigation systems have been employed for a considerable period of time for the purpose of irrigating land areas under conditions where rainfall is insufficient for optimum growing of crops. One example of a tower-supported movable irrigation system which, in this case, is movable in circular manner about a central supply pivot is depicted in U.S. Pat. No. 3,608,826. It should be noted that this patent depicts a water-carrying conduit structure made up of several sections of irrigation pipe that are coupled by a universally movable coupling. A boot is employed to contain the water pressure and prevent leakage during operation of the system. Where movable wheeled tower-supported irrigation systems are employed, in some cases the speed of rotation or speed of movement of each of the sections of irrigation pipe is controlled by a single speed electric motor that is intermittently energized and de-energized responsive to the particular angular relationship between the various pipe sections that make up the water supply conduit of the irrigation system. The eletric drive motor, together with its reduction gear mechanism, will remain de-denergized until the horizontal angular relationship between sections of the irrigation pipe reaches a predetermined value responsive to movement of adjacent towers of the irrigation system. Upon reaching the predetermined relationship, the electric drive motors will become energized, thus moving the tower associated therewith sufficiently to develop another predetermined horizontal angular relationship between the pipe sections involved, at which time the motor will be de-energized. This feature eliminates the need for expensive motor drive systems of varying speed for each of the pipe sections that revolves about the central pivot point and further enhances the competitive nature of irrigation systems that are constructed in this manner.

As tower-supported irrigation systems move during irrigation of land areas, changes in grade occur due to unevenness of the land surface. It is necessary that the various pipe sections that interfit to transport water from the water supply to the various parts of the irrigation system be capable of vertical movement to accommodate changes in grade, as well as accommodating horizontal angular misalignment responsive to tower movement. It is therefore desirable to provide coupled irrigation pipes with a pipe coupling that efficiently allows universal movement of the connected pipe sections so as to prevent the development of any strain that might otherwise cause deterioration of the connection structure between the various pipe sections.

As the angular relationship between the various pipe sections of the irrigation system changes during irrigation operations, it is of course necessary that the coupling structure establishing connection between the pipe sections be allowed to freely articulate. It is also necessary, however, that the coupling structure include a sealing element that prevents leakage of the coupling during the universal articulation that occurs as the irrigation system negotiates uneven terrain during its operation. The boot structure of U.S. Pat. No. 3,608,826 is one suitable means for preventing leakage and yet allowing articulation at the coupling connection between the pipe sections.

It is well known in the art to utilize spherical couplings for establishing articulated connection between sections of irrigation pipe, such as shown by U.S. Pat. No. 1,949,055 to Lambie and U.S. Pat. No. 2,281,633 to Stitzer and U.S. Pat. No. 2,652,282 to Willetts. Because of the spherical shape of the coupling structure, the only practical way the coupling structure can be disassembled for replacement of a seal is for the pipe sections to which the coupling structure is affixed to be moved linearly apart. In irrigation systems of considerable length, it may be impractical or at least highly undesirable to move the irrigation pipes linearly apart because to do so could require special heavy-duty lifting apparatus. It is desirable, therefore, to provide a pipe coupling structure for irrigation pipes that can be dissembled for replacement of a seal simply by partial disassembly without relative linear movement of adjacent sections of irrigation pipe.

Where irrigation pipes are supported by mobile towers, it is typical for each extremity of each of the various spans of irrigation pipe to be physically supported by the mobile tower devices or by load-supporting devices that are in turn supported by the mobile towers. The irrigation pipe sections defined by the various spans of the irrigation system must be supported in such manner that the extremities thereof will be positively aligned. Such support structures for the pipe sections are typically quite expensive and serve to detract from the commercial feasibility of the irrigation system.

As tower-supported irrigations systems move about land areas during irrigation operations, it is known that severe tensile and compressive forces are exerted on coupled pipe sections, thereby requiring that the pipe couplings be quite heavy and strong to prevent the couplings from being pulled apart. It is desirable that a spherical coupling structure be provided that is capable of withstanding severe tensile loads and yet remain free for universal movement as the pipe sections articulate during irrigation operations.

Accordingly, it is a primary object of the present invention to provide a novel universally movable coupling for irrigation pipe, which coupling incorporates a sealing element that may be simply and efficiently replaced in the event it should become worn to the point that it does not seal properly.

It is another feature of the present invention to provide a novel universally movable coupling structure having a spherical-type connection for allowing free universal movement in all directions.

It is also a feature of the present invention to provide a novel spherical coupling structure that may also incorporate a pivot pin type connection that provides for efficient resistance against tensile and compressive loads that might otherwise tend to damage or cause separation of the coupling structure during irrigation operations.

Among the several features of the present invention is noted the contemplation of a novel coupling structure for irrigation pipes incorporating means for draining the irrigation pipe sections and the coupling structure efficiently so as to facilitate simple and efficient repair or replacement of any of the parts thereof.

It is also an important feature of the present invention to provide a novel universally movable coupling structure for irrigation pipes that may be disassembled for replacement of the sealing element thereof without any requirement for linear separation of adjacent sections of irrigation pipe and which provides support for one extremity of one of the sections of irrigation pipe, both during normal irrigation operations and when disassembled.

The present invention also contemplates the provision of a novel universally movable coupling structure for irrigation pipes incorporating simple and efficient means for at least partially separating certain components of the coupling structure without the use of heavy lifting apparatus in order to facilitate simple and efficient replacement of the sealing element thereof.

Other and further objects, advantages and features of the present invention will become apparent to one skilled in the art upon consideration of the present disclosure. The form of the invention, which will now be described in detail, illustrates the general principles of the invention, but it is to be understood that this detailed description is not to be taken as limiting the scope of the present invention.

SUMMARY OF THE INVENTION

A universally movable coupling structure for irrigation pipes that incorporates a replaceable sealing element may include a first pipe section having a generally spherical internal connection element fixed thereto which defines a flow passage for allowing the flow of water therethrough during irrigation operations. A second pipe section is also included having an external connector means extending therefrom which defines a generally spherical internal surface that is adapted for mating engagement with at least a portion of the external spherical surface of the internal connection element. The external connector means extends from the lower portion of the second pipe section and provides a rest or support for the internal connector structure, even when the coupling is partially disassembled. This feature facilitates support of one extremity of the opposite pipe section to which the internal spherical connection element is affixed.

An external locking device is removably connectable to the external connector means and is also generally of partially spherical internal configuration and is adapted for mating engagement with the spherical external surface of the internal connection element. With the locking device secured to the external connector means, the spherical internal connection element is completely entrapped, thereby securing the coupling structure against inadvertent disassembly. A seal is employed that maintains a sealed relationship between the external connector means and the external locking means and between the external locking means and the second pipe section. Partial seal groove segments are also defined in the external connector means and the external locking means. The groove segments are positioned in registry when the external locking means is assembled to the external connector means so as to define an annular seal groove. An annular sealing element is ppositionable within the groove and maintains a sealed relationship with the external locking means and the external connector means, and also with the outer spherical surface of the internal connection element. This sealing element may be in the form of an O-ring which is simply replaceable when necessary.

To restrain the coupling structure against damage or inadvertent separation due to the application of severe tensile or compressive loads thereto, the external connector means may be provided with a pivot aperture that receives a pivot pin that is foxed to the internal connection element. The aperture and pin are so arranged that universal movement of the coupling is not hampered thereby. For the purpose of draining water from the irrigation pipes and coupling to reduce the weight thereof and to facilitate replacement of the seal, a drain passage may be formed in the pivot structure and may be closed by a simple closure plug that may be removed as desired for allowing draining to occur. Also, if desired, the drain may conveniently take the form of an automatic pressure sensitive drain that is capable of opening responsive to excessive pressure to provide a safety relief for the irrigation system.

For the purpose of accomplishing partial separation of the internal connection element and the external connection means to provide for the spacing that is necessary for replacement of the annular sealing element, a jack screw may be received by internal threads defined on the external connector means and may be manipulated as desired to force the internal connection element away from the external connector means. Separation for replacement of the sealing element may therefore be accomplished simply by utilizing an ordinary wrench for manipulation of the jack screw. To allow such separation, the coupling structure is arranged to allow vertical movement of the internal connection element relative to the external connector means after the external locking device has been removed. The coupling structure may therefore be simply and efficiently repaired by repair personnel utilizing ordinary tools, thus alleviating the necessity of providing expensive lifting and handling equipment and allowing seal replacement operations to be completed within a very short period of time with a minimum of labor.

An alternative means for accomplishing vertical separation of the coupling elements without requiring linear separation of the adjacent sections of irrigation pipe may involve the use of a portable jack such as a hydraulic jack. A stationary portion of the jack may be connected to one of the coupling elements, and a movable portion of the jack may engage or be connected to the other of the coupling elements. After the coupling has been prepared for vertical separation by removal of the locking cover element, the jack may be operated to separate the coupling elements vertically. The sealing element will then be exposed for easy replacement.

BRIEF DESCRIPTION OF THE DRAWINGS

So that the manner in which the above recited features, advantages and objects of the present invention, as well as others which will become apparent, are attained and can be understood in detail, more particular description of the invention briefly summarized above may be had by reference to the embodiment thereof which is illustrated in the appended drawings, which drawings form a part of this specification.

It is to be noted, however, that the appended drawings illustrate only a typical embodiment of the invention and are therefore not to be considered limiting of its scope, for the invention may admit to other equally effective embodiments.

IN THE DRAWINGS

The present invention, both as to its organization and manner of operation, may best be understood by way of example of a certain embodiment when taken in conjunction with the accompanying drawings in which:

FIG. 1 is a partial elevational view of a pair of truss assemblies including irrigation pipe sections and illustrating a universally movable coupling that interconnects a pair of pipe sections, which coupling structure is constructed in accordance with the present invention.

FIG. 2 is a fragmentary sectional view of the truss pipe section and coupling structure illustrated in FIG. 1 showing only a portion at each extremity of the pipe sections and showing the coupling structure in section, with the rear portion of the coupling being illustrated in broken line.

FIG. 3 is a fragmentary partial sectional view of the coupling and pipe section structure illustrated in FIG. 2 and showing the internal connector element of the coupling structure being separated by means of a jack screw structure for facilitating replacement of the annular sealing element.

FIG. 4 is a sectional view of the coupling structure taken along line 4—4 of FIG. 2.

DETAILED DESCRIPTION OF PREFERRED EMBODIMENT

Referring now to the drawings and first to FIG. 1, there is depicted a portion of an irrigation system generally at 10 defined by interconnected spans that are typically supported above the surface being irrigated by mobile towers. Each of the spans may incorporate a support truss, as shown at 12 and 14, that are connected respectively to sections of irrigation pipe shown at 16 and 18. Spherical coupling structure for establishing sealed connection between the pipe sections 16 and 18 and allowing articulation of the pipe sections relative to one another is shown generally at 20.

Referring now to FIG. 2, an internal connection element is shown at 22 that may be connected by welding or by any other suitable form of connection to the pipe section 18. The connector element 22 may be formed to define a generally spherical outer surface 24 and defines openings, such as shown at 26 and 28, for allowing the flow of water or other fluid through the coupling structure. When the irrigation system is installed, a support tower will be provided in conventional manner that will support the extremity of the irrigation pipe section 16 that is near the coupling. It is desirable that the extremity of the pipe section 18 also be supported by that same support tower, and such is readily accomplished in accordance with the present invention. An external connector element 30 may be provided with a pipe-engaging portion 28 that may be secured to the pipe section 16 by welding or by any other suitable form of attachment. As shown in FIGS. 2 and 3, the pipe-engaging portion 28 is of generally semi-cylindrical configuration. The external connector element 30 is formed to define an internal surface 32 that is of at least partially spherical configuration with the same relative degree of spherical curvature as compared to the configuration of the internal connection element 22. The partially spherical surfaces 24 and 32 are adapted for mating engagement. Because the external connector element 30 is connected to the lower portion of the pipe section 16 and at the extremity thereof, the upwardly facing concave spherical surface portion 32 effectively defines a receptacle that receives and provides support for the internal connection element 22. This allows the weight of a portion of the pipe section 18 and the internal connection element, together with the weight of other components of the truss and span structure, to be transferred through the coupling structure to the pipe section 16 and thence to the mobile tower that provides both support and mobility for the spans of the irrigation system. The weight of the water contained within the spans is of course also distributed as well through the coupling structure and pipe sections to the mobile tower devices.

An external locking element 34 may be provided having a generally semi-cylindrical portion 36 that may be fitted about the upper exposed extremity of pipe section 16. The external locking element 34 may be provided with a pair of side flanges 38 that may be positioned in assembly with side flanges 40 formed on the external connector element 30. The flanges 38 and 40 may be secured in assembly by means of bolts 42 or any other suitable removable connector devices. For the purpose of establishing a seal at the housing joint established by flanges 40 and 42, a sealing element 44 is provided between each of the flanges 38 and 40 which is deformed upon compression by the force induced by the bolts 42 to provide a positive seal between the external connector structure and the external locking device. The establishment of a seal between the external locking device and the cylindrical outer surface of the pipe section 16 above the lower flanges 40 may be accomplished by means of a semi-circular sealing element 46 that is retained within a semi-circular groove 48 defined within the external locking device. The semicircular sealing element 46 may, if desired, be molded integrally with the flange sealing elements 44. Also if desired, the semi-circular sealing element 46 may be connected to the flange sealing elements 44 in any desired manner.

It is desirable that the spherical universally movable coupling be able to withstand severe tensile loads that might tend to separate it, as well as being able to withstand compressive loads. In accordance with the present invention, such is conveniently accomplished by means of a pivot pin 50 that may be fixed to the lower portion of the internal connection element 22 by welding or by any other suitable means of attachment. The pivot pin 50, when the internal connection element is coupled to the external connector device, will extend through a pivot aperture 52 in rather loose-fitting relation therewith. The loose-fitting relationship or unusually large clearance between the pivot pin 50 and the pivot pin aperture 52 effectively allows vertical pivoting of one of the pipe sections relative to the other within desired limits. This unusually large clearance effectively promotes the universally movable characteristics of the coupling structure. When large tensile forces are applied to the pipe sections, tending to separate the components of the coupling structure, the pivot pin 50 and its interrelation with the aperture 52 will resist such tensile forces and restrain the couplings against disassembly.

The mating elements of the spherical pipe coupling, in addition to allowing universal articulation of the pipe sections, also function effectively to retain the pipe sections against linear separation. The internal and external components of the coupling structure are of sufficient structural integrity that linear forces applied through the pipe sections to the coupling structure during normal operation of the irrigation system will be effectively transmitted through the coupling without adverse effect. In the event excessively large tensile forces are applied to the pipe sections that might otherwise cause the internal or external components of the coupling to yield, the pivot pin 50 and its interrelation with the aperture 52 will serve a force-resisting safety function, resisting such tensile forces and preventing the components of the coupling from becoming overstressed. Normal operation of the irrigation system, however, will not allow physical separation of the coupling through yielding of the outer spherical housing, and therefore the pivot pin will rarely have a linear force restraining function.

When the irrigation system is shut down, it is desirable to provide means for automatically draining the pipe sections and couplings. This is important especially when freezing temperature is encountered because of the damage that is likely to occur by formation of ice in the pipe sections and couplings. It is also important from the standpoint of weight reduction when it is desired to transport the irrigation system from place to place by towing operations. Also, for repair operations, such as coupling seal replacement, it is necessary to clear the water from the pipe sections and coupling. Water may be drained from both the pipe sections and the coupling by means of a drain outlet passage 54 that is formed in the pivot pin structure 50. The outer portion of the passage 54 is internally threaded in order to receive an automatic drain valve 56 that prevents flow through the drain passage 54 with the irrigation apparatus is in operation. Automatic drain valves are commercially available and may take any one of a number of different forms without departing from the spirit and scope of the present invention.

It will of course be desirable to provide a seal between the internal and external components of the coupling structure to prevent leakage of water or other fluid at the coupling. In accordance with the present invention, the provision of such a seal may be accomplished in the manner depicted particularly in FIG. 2 of the drawings. The external connector structure 30 and the external locking device 34 may be formed to define generally semi-circular groove segments that will be disposed in registry when the external locking device is connected to the external connector structure, so as to define an annular seal groove 58. An annular sealing element 60, which may conveniently take the form of an elastomeric O-ring for example, may be located within the annular groove 58 with the inner peripheral portion thereof disposed in sealed engagement with the spherical surface 24 of the internal connection element 22. The annular groove 60 is of sufficient depth that assembly of the coupling structure will cause slight deformation of the inner peripheral portion of the sealing element 60, thereby maintaining a positive seal at all times. There is no tendency for the annular sealing element 60 to become overcompressed because the degree of compression thereof is limited by the relationship of the sealing element to its groove and to the internal connection element. As the pipe sections 16 and 18 are articulated, the spherical internal connection element will move relative to the external connector means and the external locking means. The sealing element 60 effectively maintains a positive fluid-tight seal, regardless of whether the coupling structure is static or moving.

It is desirable to provide for replacement of the sealing element 60 while the coupling structure 20 is partially assembled, and it is also desirable that replacement of the sealing element be easily and simply accomplished without necessitating the use of expensive lifting equipment. Since the spherical portion of the external connector device 30 extends upwardly only to approximately the center of the spherical internal connection element 22, removal of the external locking device 34 will allow the spherical internal connection element, together with the pipe section to which it is connected, to move upwardly, thereby separating the lower portion of the internal connection element from the internal spherical surface 32 of the external connection device. Such separation is illustrated in FIG. 3. After the internal connection element has moved upwardly to a certain desirable extent, the sealing element 60 may be simply removed and replaced. As shown in FIG. 3, at the upper portion of the internal connection element 22 the sealing element 60 is moved out of contact with the spherical surface 24. After this has been accomplished, the lower portion of the sealing element 60 may be simply withdrawn from the groove 58. Replacement of a new sealing element may be accomplished in reverse manner with the lower portion of the sealing element being inserted into the groove 58. After this has been accomplished, the upper portion of the sealing element is then capable of being moved into operative relation with the spherical surface 24 after the internal connection element has again moved more nearly toward its properly seated relationship with respect to the internal spherical receptacle surface 32.

For the purpose of accomplishing separation of the internal connection element 22 from the spherical receptacle surface 32 of the external connector device, a jack may be provided that may take any one of a number of different forms. One simple jack may comprise a screw type jack that may be operated simply by rotating a jack screw bolt with a wrench. A boss or weldment 62 may be defined on the external connector device with the boss being internally threaded for the purpose of receiving the external threads of a jack screw device 64. An operating head 66 may be provided on the jack screw device, which operating head may be of hexagonal configuration allowing the jack screw device to be received and manipulated by a conventional wrench that is rotated by repair personnel. As shown in FIG. 2, the jack screw 64 is retracted and the spherical surface 22 is disposed in seating engagement with the spherical receptacle surface 32. To achieve separation of the internal connection element from the external connector device so as to separate the spherical surface 24 and the spherical receptacle surface and allow removal and replacement of the annular sealing element 60, the jack screw device may be manipulated to the position shown in FIG. 3, causing the desired separation to occur. The jack screw simply bears upon the internal connection element and forces it upwardly relative to the external connector device if the external connector device is stabilized by a mobile tower, as is typically the case.

The jack may also be in the form of a portable hydraulic jack that may be simply connected to jack fitments provided on the coupling structure. For example, one portion of the jack may be received by a suitable jack fitment provided on the external spherical housing and another element of the jack may interfit with a jack fitment on the internal spherical portion of the coupling. Operation of the jack will simply separate the internal and external coupling elements and expose the sealing element so it can be replaced.

To prevent inadvertent separation of the internal connection element from the external connector device and allow proper reseating of the spherical surface 24 relative to the spherical receptacle surface 32 after seal replacement has been accomplished, it should be borne in mind that the pivot element 50 is of considerable length and maintains an operative structural interconnection between the internal connection element and the external connection device, even when the internal connection element has been moved by the jack to the position allowing removal and replacement of the sealing element. The pivot element therefore prevents linear separation of the pipe sections even when the sealing element is being replaced. This safety feature is clearly apparent from FIG. 3 of the drawings.

OPERATION

As an irrigation system traverses a field area to be irrigated, undulations in the terrain and position-responsive movement of the irrigation system over the land area will cause angular misalignment of the various pipe sections to occur. With the spherical coupling structure of the present invention, universal movement of the coupling structure is effectively allowed within certain angular limits, and a continuous flow of water passes through the pipe sections of the irrigation system without any leakage occurring at the couplings. Tensile and compressive loads applied to the coupling structure will not cause the internal and external components of the coupling to separate because of the force-restraining capability of the ball and socket type connection that is established by the coupling elements. Additionally, the pivot pin structure 50, cooperating with the aperture 52, will resist excessively severe tensile loads that may be applied as the irrigation system operates. The pivot pin and aperture cooperate to allow transfer of compressive forces through the coupling structure only after structural failure of the ball and socket type coupling. With the external locking device secured to the external connector device, the pivot pin 50 will not be allowed to move upwardly relative to the external connector device 30, and therefore the pin and aperture connection will be positively maintained at all times. The external locking device, when in place, serves to complete the socket of the ball and socket type joint and therefore assists in retaining the inner spherical portion of the coupling against linear as well as vertical separation.

Should it become desirable to drain the pipe sections and coupling structure, this will be accomplished automatically simply by shutting off the supply of water to the irrigation pipe. The automatic drain valve connected to the pivot pin structure 50 will open responsive to pressure reduction in the irrigation pipe, thereby opening the drain passageway 52 and allowing drainage to occur. Obviously, any other type of automatic drain system or manual drain system will be acceptable within the spirit and scope of this invention.

Should it become desirable to replace the annular sealing element 60, which might have become worn or damaged to the point that proper sealing will not occur, repair personnel will simply remove the bolt connection devices 42, thereby allowing the external locking device to be separated from the external connector means. When this has been accomplished, upward movement of the internal connection element 22 is no longer restrained, and such upward movement is desired to provide sufficient clearance to allow removal and replacement of the sealing element. The repair personnel will simply utilize a conventional wrench applied to the wrench head 66 of the jack screw 64 and will rotate the jack screw relative to the threaded boss 62 sufficiently to separate the internal connection element from the external connector device, such as shown in FIG. 3. After this has been accomplished, the sealing element 60 may be removed and replaced, after which the jack screw can be counter-rotated and retracted to the position illustrated in FIG. 2, thereby again seating the spherical surface 24 of the internal connection element 22 in mating relation with the receptacle surface 32.

If a portable manual or hydraulic jack is employed as discussed above to accomplish separation of the internal and external portions of the coupling, the jack will simply be reversed after the new seal has been positioned to reassemble the coupling.

Assuming that the sealing element 44 and its cooperating sealing element 46 is in good condition and is not in need of replacement, the external locking device may be applied to the external connection device in such manner that the bolt apertures receiving bolts 42 are aligned, and the sealing element 46 is received within its groove 48. After the bolts have been tightened, the newly repaired coupling structure will then be ready for operation.

In view of the foregoing, it is clear that a universally movable coupling structure has been provided in accordance with the present invention for application in conjunction with movable tower-supported irrigation pipe, which coupling device is capable of achieving universal angular relationship between the sections of the irrigation pipe in both the horizontal and vertical planes without causing the irrigation pipe sections to be overstressed in any way. The coupling structure that is provided is a very simple and low-cost nature and yet is constructed to withstand severe tensile and compressive loads without allowing the pipe sections to be separated. The coupling structure utilizes spherical construction incorporating a ball and socket effect in order to allow freedom of universal movement. The ball and socket connection also efficiently transmits compressive and tensile loads that are applied thereto during normal operation of the irrigation system.

By incorporating a simple two-piece external housing structure that mates with an internal connection element of spherical configuration, access to the internal portion of the coupling structure may be simply and efficiently gained for the purpose of removing and replacing an annular sealing element that establishes the primary seal of the coupling. The coupling structure may be simply and efficiently repaired by repair personnel utilizing tools of simple and ordinary nature and without involving the use of expensive lifting equipment that is ordinarily necessary for the repair of leaking joints between irrigation pipe sections. A single repairman, functioning alone, is quite capable of partially disassembling the coupling housing separating the internal and external components of the coupling to a spaced relation for replacement of the sealing element. Therefore, the repair costs of the irrigation apparatus incorporating couplings constructed in accordance with this invention can be maintained quite low without any sacrifice whatever from the standpoint of operational efficiency.

It is therefore seen that this invention is one well adapted to attain all of the objects and advantages hereinabove set forth, together with other features and advantages which will become obvious and inherent from a description of the apparatus itself. It will be understood that certain combinations and subcombinations are of utility and may be employed without reference to other features and subcombinations. This is contemplated by and is within the scope of the present invention.

What is claimed is:

1. A universally movable coupling for irrigation pipes having a replaceable sealing element, said coupling comprising:
    a first pipe section;
    an internal connection element extending from said first pipe section and having a flow passage defined therein for allowing fluid flow therethrough, said internal connection element defining a generally spherical external surface;
    first pivot means being defined by said internal connection element;
    a second pipe section;
    external connector means extending from said second pipe section and defining a generally spherical internal surface that is adapted for mating engagement with at least a portion of the generally spherical external surface of said internal connection element and defining a concave supporting receptacle for supporting said internal connection element and one extremity of said first pipe section, said concave supporting receptacle defining second pivot means for interengaging relation with said first pivot means;
    external locking means being connectable to said external connector means and being formed to define a partially spherical internal surface that is adapted for mating engagement with at least a portion of the spherical external surface of said internal connection element;
    said external connector means and said external locking means each being formed to define internal seal groove segments that are disposed in registry upon assembly of said external locking means to said external connector means to define an annular seal groove;
    an annular sealing element being receivable with said annular seal groove and establishing a movable seal between said internal connection element and said external connector and said external locking means; and
    separation means being provided on one of said internal connection element and said external connection means, said separation means being movable to accomplish sufficient separation of said internal connection element and external connection means to facilitate removal and replacement of said sealing element.

2. A universally movable coupling as recited in claim 1, wherein:
    said internal connection element is movable vertically relative to said external connector means disengaging said first pivot means from said second pivot means when said external locking means is disassembled from said external connector means; and
    said annular sealing element is replaceable upon separation of said external connector means and said internal connection element.

3. A universally movable coupling as recited in claim 1, wherein:
    said external connector means is movable vertically relative to said internal connection element when said external locking means is disassembled from said external connector means;
    said annular sealing element is replaceable upon separation of said external connector means and said internal connection elements; and
    said separation means comprises a jack screw connected to said external connector means and positioned for engagement with said internal connection element, wherein rotation of said jack screw in one direction accomplishes said separation of said external connector means and said internal connection element.

4. A universally movable coupling as recited in claim 1, wherein said separation means comprises:
    thread means being defined by said external connector means; and
    a jack screw being threadedly received by said thread means and having one extremity thereof adapted for engagement with said internal connection element, said jack screw upon selective manipulation relative to said external connector means separating said external connector means from said internal connector element to allow replacement of said annular sealing element.

5. A universally movable coupling as recited in claim 1, wherein said coupling includes:
    joint seal means adapted to be interposed in sealed relation between said external connector means and said external locking means and between said external locking means and said second pipe section.

6. A universally movable coupling for irrigation pipes having a replaceable sealing element, said coupling comprising:
    a first pipe section;
    an internal connection element extending from said first pipe section and having a flow passage defined therein for allowing fluid flow therethrough, said internal connection element defining a generally spherical external surface;
    a pivot pin extending from the lower portion of said internal connection element;
    a second pipe section;
    external connector means extending from said second pipe section and defining a generally spherical internal surface that is adapted for mating engagement with at least a portion of the generally spherical external surface of said internal connection element and defining a concave supporting receptacle for supporting said internal connection element and one extremity of said first pipe section, said concave supporting receptacle defining a pivot aperture releasably receiving said pivot pin to retain said coupling against longitudinal separation;

external locking means being connectable to said external connector means and being formed to define a partially spherical internal surface that is adapted for mating engagement with at least a portion of the spherical external surface of said internal connection element;

said external connector means and said external locking means each being formed to define internal seal groove segments that are disposed in registry upon assembly of said external locking means to said external connector means to define an annular seal groove;

an annular sealing element being receivable with said annular seal groove and establishing a movable seal between said internal connection element amd said external connector and said external locking means; and separation means being provided on one of said internal connection element and said external connection means, said separation means being movable to accomplish sufficient separation of said internal connection element and external connection means to facilitate removal and replacement of said sealing element.

7. A universally movable coupling as recited in claim 6, wherein:

a drain passage is formed in said pivot pin and communicates the flow passage of the coupling with the atmosphere; and closure means is provided for said drain passage and may be selectively opened and closed as desired for draining fluid from said pipe sections and coupling.

8. A universally movable coupling for irrigation pipes having a replaceable sealing element, said coupling comprising:

a first pipe section;

an internal connection element extending from said first pipe section and having a flow passage defined therein for allowing fluid flow therethrough said internal connection element defining a generally spherical external surface and defining first pivot means;

a second pipe section;

external connector means defining a generally semi-cylindrical portion that is weldable to said second pipe section said external connector means defines a generally spherical internal surface that is adapted for mating engagement with at least a portion of the spherical external surface of said internal connection element and defines a concave supporting receptacle for supporting said internal connection element and one extremity of said first pipe section, said concave supporting receptacle defining second pivot means for interengaging relation with said first pivot means;

external locking means being connectable to said external connector means and being formed to define a partially spherical internal surface that is adapted for mating engagement with at least a portion of the spherical external surface of said internal connection element;

an annular sealing element being receivable in movable sealed engagement between said internal connection element and said external connector means and between said internal connection element and said external locking means; and separation means being provided on one of said internal connection element and said external connection means, said separation means being movable to accomplish sufficient separation of said internal connection element and external connection means to facilitate removal and replacement of said sealing element.

9. A universally movable coupling as recited in claim 8, wherein said coupling includes:

means for limiting the amount of compression of said annular sealing element.

10. A universally movable coupling as recited in claim 9, wherein said means for limiting the amount of compression of said annular sealing element comprises:

a first groove segment being formed in said external connector means;

a second groove segment being formed in said external locking means, upon assembly of said external locking means to said external connector means said first and second groove segments registering to define an annular seal groove; and said annular sealing element being locatable within said annular seal groove with a predetermined annular portion of said sealing element protruding from said groove and establishing sealing engagement with said internal connection element.

11. A universally movable coupling as recited in claim 9, wherein:

said internal connection element is movable vertically relative to said external connection means disengaging said first and second pivot means when said external locking means is disassembled from said external connector means; and said annular sealing element is replaceable upon separation of said external connector means and said internal connection element.

12. A universally movable coupling as recited in claim 8, wherein:

said separation means comprises jacking means carried by said coupling and selectively operable to impart separation movement of said internal connection element relative to said external connection element for access to said sealing element.

13. A universally movable coupling as recited in claim 12, wherein said jacking means comprises:

thread means being defined by said external connector means; and a jack screw being threadedly received by said thread means and having one extremity thereof adapted for engagement with said internal connection element, said jack screw upon selective manipulation relative to said external connector means separating said external connector means from said internal connector element to allow replacement of said annular sealing element.

14. A universally movable coupling for irrigation pipes having a replaceable sealing element, said coupling comprising:

a first pipe section;

an internal connection element extending from said first pipe section and having a flow passage defined therein for allowing fluid flow therethrough said internal connection element defining a generally spherical external surface and having a pivot pin depending therefrom;

a second pipe section;

external connector means defining a generally semi-cylindrical portion that is weldable to said second pipe section said external connector means defines a generally spherical internal surface that is adapted for mating engagement with at least a portion of the spherical external surface of said internal connection element and defines a concave supporting receptacle for supporting said internal connection element and one extremity of said first pipe section, said concave supporting receptacle defining an aperture for receiving said pivot pin and establishing a mechanical connection between said internal connection element and external connector means;

external locking means being connectable to said external connector means and being formed to define a partially spherical internal surface that is adapted for mating engagement with at least a portion of the spherical external surface of said internal connection element;

an annular sealing element being receivable in movable sealed engagement between said internal connection element and said external connector means and between said internal connection element and said external locking means;

means for limiting the amount of compression of said annular sealing element;

a drain passage being defined in said pivot pin means and communicating said flow passage of said coupling with the atmosphere when said drain passage is open; and closure means is provided for said drain passage and may be selectively opened and closed as desired for draining fluid from said pipe sections and coupling.

* * * * *